(12) United States Patent
Modén

(10) Patent No.: US 7,813,543 B2
(45) Date of Patent: Oct. 12, 2010

(54) COMPUTER MODELING OF PHYSICAL SCENES

(75) Inventor: Anders Modén, Nässjö (SE)

(73) Assignee: SAAB AB, Linköping (SE)

( * ) Notice: Subject to any disclaimer, the term of this patent is extended or adjusted under 35 U.S.C. 154(b) by 974 days.

(21) Appl. No.: 11/570,130

(22) PCT Filed: Jun. 8, 2005

(86) PCT No.: PCT/EP2005/052640

§ 371 (c)(1),
(2), (4) Date: Dec. 7, 2006

(87) PCT Pub. No.: WO2005/122091

PCT Pub. Date: Dec. 22, 2005

(65) Prior Publication Data

US 2007/0250465 A1 Oct. 25, 2007

(30) Foreign Application Priority Data

Jun. 11, 2004 (EP) .................................. 04013783

(51) Int. Cl.
*G06T 17/00* (2006.01)
(52) U.S. Cl. ....................................................... 382/154
(58) Field of Classification Search .................. 382/154
See application file for complete search history.

(56) References Cited

U.S. PATENT DOCUMENTS 5,644,651 A * 7/1997 Cox et al. .................... 382/154
6,891,966 B2 * 5/2005 Chen .......................... 382/145

OTHER PUBLICATIONS

Pollefeys, Marc: "Tutorial on 3D Modeling from Images" Lecture Notes 'Online! Jun. 26, 2000, XP002313028 Dublin Ireland.

(Continued)

*Primary Examiner*—Brian P Werner
(74) *Attorney, Agent, or Firm*—Venable LLP; Eric J. Franklin

(57) ABSTRACT

The present invention relates to automatic modeling of a physical scene. At least two images ($I_1$, $I_2$) of the scene are received, which are taken from different angles and/or positions. A matching module (130) matches image objects in the first image ($I_1$) against image objects in the second image ($I_2$), by first loading pixel values for at least one first portion of the first image ($I_1$) into an artificial neural network (133). Then, the artificial neural network (133) scans the second image ($I_2$) in search of pixels representing a respective second portion corresponding to each of the at least one first portion; determines a position of the respective second portion upon fulfillment of a match criterion; and produces a representative matching result ($M_{12}$). Based on the matching result ($M_{12}$), a first calculation module (140) calculates a fundamental matrix ($F_{12}$), which defines a relationship between the first and second images ($I_1$, $I_2$). Based on the fundamental matrix ($F_{12}$), in turn, a second calculation module (150) calculates a depth map ($D_{12}$), which describes distance differences between a set of image points in the first image ($I_1$) and a corresponding set of image points in the second image ($I_2$). Finally, the depth map ($D_{12}$) constitutes a basis for a synthetic model of the scene.

14 Claims, 2 Drawing Sheets

OTHER PUBLICATIONS

Ruichek Y: "A hierarchical neural stereo matching approach for real-time obstacle detection using linear cameras" Intelligent Transportation Systems, 2003. Proceedings. 2003 IEEE Oct. 12-15, 2003 Piscataway, NJ, USA, IEEE, vol. 1, Oct. 12, 2003.

Neubert J et al: "Automatic training of a neural net for active stereo 3D reconstruction" Proceedings of the 2001 IEEE International Conference on Robotics and Automation. ICRA 2001. Seoul, Korea, May 21-26, 2001. Proceedings of the IEEE International Conference on Robotics and Automation, New York, NY: IEEE, US, vol. vol. 1 of 4, May 21, 2001.

* cited by examiner

COMPUTER MODELING OF PHYSICAL SCENES

Cross Reference to Related Applications

This application is a national stage application of International Application PCT/EP2005/052640, filed 8 Jun. 2005, designating the United States of America.

THE BACKGROUND OF THE INVENTION AND PRIOR ART

The present invention relates generally to image based modeling. More particularly the invention relates to a method of automatically modeling a physical scene and a corresponding apparatus. The invention also relates to a computer program and a computer readable medium.

Modern image processing has provided us with highly efficient tools for registering the properties of complex physical scenes. The advances in computer graphics have also enabled a real time visualization of such scenes.

Pollefeys, M., "Tutorial on 3D Modeling from Images", Katholike Universiteit, Leuven, 26 Jun. 2000, Dublin, Ireland, in conjunction with ECCV 2000 describes how a three-dimensional surface model of a scene can be obtained from a sequence of images taken by a freely moving camera. Pollefeys proposes that a depth map be created by relating different images of the same objects to one another, for instance based on feature extraction and cross-correlation. The depth map, in turn, forms a basis for a three-dimensional model of the scene in which the objects are included.

Although Pollefeys' algorithm is robust and reliable it is still too processing intensive to be performed in real time. Thus, a synthesizing based on this algorithm must be made in advance of any visualization. On the other hand, active registration procedures where light (e.g. laser or infra red) is projected towards the scene, may allow a faster generation. However, these strategies provide a substantially lower resolution (which is dependant on the projected light), and therefore cannot be used to accomplish a satisfying degree of realism.

SUMMARY OF THE INVENTION

The object of the present invention is therefore to provide an improved three-dimensional modeling a physical scene, which alleviates the above problems and thus offers a means for generating the depth map in real time.

According to one aspect of the invention the object is achieved by the method as initially described, wherein the matching step involves: loading pixel values for a first image portion of the first image into an artificial neural network; scanning, by means of the artificial neural network, the second image in search of pixels representing a second image portion corresponding to the first image portion; and determining a position of the second image portion upon fulfillment of a match criterion in the artificial neural network in respect of the first and second image portions.

This method is advantageous because the artificial neural network allows a prompt shifting between learning and recognition, and thus an efficient non-linear filtering may be obtained. Moreover, the method is completely automatic, and the depth buffer generated thereby is very suitable for use in an image based rendering (IBR) procedure. Consequently, efficient real time visualization may also be accomplished.

According to a preferred embodiment of this aspect of the invention, the scanning further involves: generating a database which represents image patterns that occur in the first image; and performing the scanning of the second image with support from representations in the database. This is desirable because the database enhances the efficiency of the method.

According to another preferred embodiment of this aspect of the invention, the matching step includes: dividing the first image into a number of first regions of interest, and for each first region of interest; loading pixel values for the first region of interest into the artificial neural network; scanning, by means of the artificial neural network, the second image in search of a second region corresponding to the first region of interest; and determining a position of the second region in the second image upon fulfillment of a match criterion in the artificial neural network in respect of the first regions of interest and the second region. The proposed division of the first image into regions of interest is advantageous because thereby the search performed in the subsequent scanning step may be narrowed substantially.

According to another preferred embodiment of this aspect of the invention, the matching step includes an initial filtering sub-step, wherein the first and second images are processed (e.g. high-pass filtered) into corresponding first and at least one second filtered images with respect to which the subsequent steps of the method are performed. Thereby, the matching accuracy is improved.

According to yet another preferred embodiment of this aspect of the invention, the initial filtering step specifically involves applying an edge-detecting operator. This, in turn, further improves the accuracy of the subsequent matching.

According to still another preferred embodiment of this aspect of the invention, the method includes calibrating the depth map into a metric model of the physical scene. Namely, thereby measurements may easily be performed with respect to the model.

According to a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above-proposed method.

According to another aspect of the invention the object is achieved by the initially described apparatus, wherein the matching module includes an artificial neural network, which is adapted to match the image objects in the first image against the image objects in the second image by: receiving pixel values for at least one first portion of the first image; scanning the second image in search of pixels representing a respective second portion corresponding to each of the at least one first portion; and determining a position of the respective second portion upon fulfillment of a match criterion in respect of the first and second portions.

An important advantage attained by this apparatus is that the artificial neural network in the matching module allows a prompt shifting between learning and recognition, which in turn enables an efficient non-linear filtering. As a result, a resourceful real time visualization of the physical scene can be accomplished.

According to a preferred embodiment of this aspect of the invention, the apparatus includes a database into which the artificial neural network is adapted to store representations of image patterns that occur in the first image. The artificial neural network is further adapted to perform the scanning of the second image with support from representations in the database. This enhances the efficiency of the apparatus.

According to another preferred embodiment of this aspect of the invention, the matching module includes a dividing means, which is adapted to divide the first image a number of first regions of interest. For each first region of interest, the matching module loads pixel values for the first region of interest into the artificial neural network; scans the second image in search of a second region corresponding to the first region of interest; and determines a position of the second region upon fulfillment of a match criterion in respect of the first region of interest and the second region.

According to yet another preferred embodiment of this aspect of the invention, the image pre-processor includes a filter means, which is adapted to perform an initial filtering, wherein the first and second images are processed into corresponding first and second filtered images with respect to which the dividing means is adapted to perform the subsequent steps. This filtering is advantageous because it enhances the dividing means accuracy. Preferably, the filter means includes an edge-detecting operator. Namely, thereby the accuracy is further improved.

According to still another preferred embodiment of this aspect of the invention, the image interface is adapted to be connected to a camera, which registers the at least two images, and delivers them to the apparatus via the image interface. Thereby, a complete scene registering arrangement is attained.

The proposed solution uses an entirely passive data registering means. This renders the invention well adapted to military applications, wherein typically stealth is a key issue. Moreover, a passive strategy is generally preferable at long ranges, e.g. outdoors, where active alternatives often become problematic. A passive method is also advantageous because it allows analysis and calculation of the image depth, both in real time and posterior. Additionally, a correct correlation between image buffer and the depth buffer is attained, since the latter is calculated from the former.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
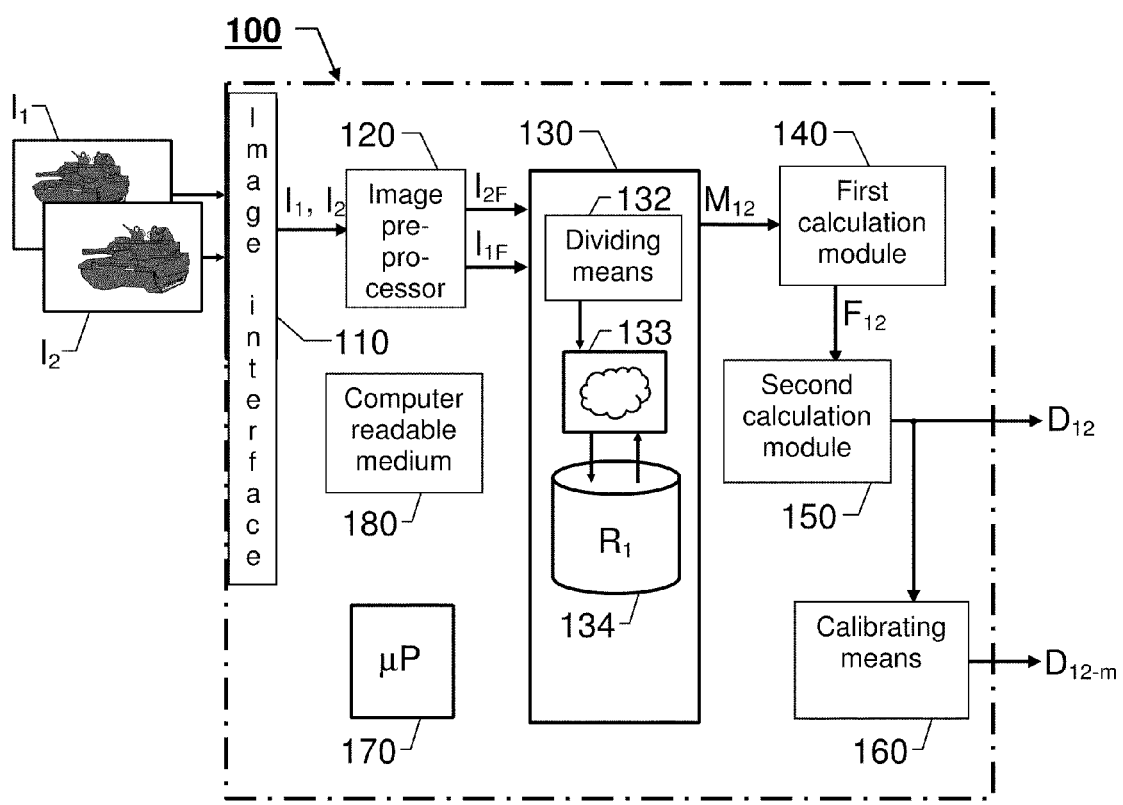
FIG. 1 shows a block diagram over an apparatus according to one embodiment of the invention.

An apparatus 100 for automatically modeling a physical scene according to one embodiment of the invention is illustrated by means of a block diagram in FIG. 1. It is presumed that the scene to be modeled includes at least one object, such as a building, a vehicle or a tree, which has certain dimensions and surface properties.

The apparatus 100 includes an image interface 110, an image preprocessor 120, a matching module 130 and at least one calculation module 140 and 150. Preferably, the apparatus 100 also contains a central processing unit 170 for controlling the operation of the other units and modules therein. The central processing unit 170, in turn, operates according to a computer program, which is stored in a computer readable medium 180 associated with the apparatus 100.

The image interface 110 is adapted to receive a number of images $I_1$ and $I_2$ (at least two) of the scene to be modeled. Preferably, the image interface 110 is adapted to be connected to a camera (e.g. a video camera), which in turn, registers the images $I_1$ and $I_2$. A first image $I_1$ is registered at a first position and a first angle with respect to the scene, and a second image $I_2$ is registered at a second position and a second angle with respect to the scene. The second position and/or the second angle are here different from the first position and/or the first angle, so that the contents of the images $I_1$ and $I_2$ are different to some extent. The image pre-processor 120 is adapted to adjust the intensity levels of the received images $I_1$ and $I_2$, such that a subsequent image processing is made independent from any initial difference in an absolute intensity level between the received images $I_1$ and $I_2$. In practice, this pre-processing normally involves a high-pass filtering of the images $I_1$ and $I_2$.

The matching module 130 is adapted to match image objects in the first image $I_1$ against image objects in the second image $I_2$, and in response thereto produce a matching result $M_{12}$ describing a relationship between the first and second images. According to the invention, the matching module 130 includes an artificial neural network 133, which is adapted to match the image objects in the first image $I_1$ against the image objects in the second image $I_2$ by receiving pixel values for at least one first portion of the first image $I_1$. Then, the artificial neural network 133 scans the second image $I_2$ in search of pixels that represent a respective second portion corresponding to each of the at least one first portion. Upon fulfillment of a match criterion in respect of the first and second portions, the artificial neural network 133 determines a position of the respective second portion, and delivers a matching result $M_{12}$ that reflects this information.

According to a preferred embodiment of the invention, the matching module 130 is associated with, or includes, a database 134 into which the artificial neural network 133 is adapted to store representations $R_1$ of image patterns that occur in the first image. The artificial neural network 133 is then further adapted to perform the scanning of the second image $I_2$ with support from representations $R_1$ in the database 134.

According to another preferred embodiment of the invention, the matching module 130 includes a dividing means 132, which is adapted to divide the first image $I_1$ into a number of first regions of interest. For each first region of interest the matching module 130 loads pixel values for the first region of interest into the artificial neural network 133; controls the artificial neural network 133 to scan the second image $I_1$ in search of a second region corresponding to the first region of interest; and upon fulfillment of a match criterion in respect of the first region of interest and second region, determines a position of the second region.

Preferably, the image pre-processor 120 contains a filter means, such as an edge-detecting operator, which is adapted to perform an initial filtering of the first and second images $I_1$ and $I_2$. The filter means process the images $I_1$, and $I_2$ into corresponding first and second filtered images $I_{1F}$ and $I_{2F}$ with respect to which the dividing means 132 is adapted to perform the subsequent steps.

A first calculation module 140 is adapted to receive the matching result $M_{12}$ from the matching module 130. Based on this matching result $M_{12}$, the first calculation module 140 calculates a fundamental matrix $F_{12}$ that defines a relationship between the first image $I_1$ and the second image $I_2$. In order to produce the fundamental matrix $F_{12}$, however, several matches are required (typically at least nine). For example, the fundamental matrix $F_{12}$ may describe dispersions (or differences) in pixel values between the images $I_1$ and $I_2$. A second calculation module 150 is adapted to receive the fundamental matrix $F_{12}$, and based thereon calculate a depth map $D_{12}$, which describes distance differences (i.e. depths) between a set of image points in the first image $I_1$ and a corresponding set of image points in the second image $I_2$. Of course, the fundamental matrix- and depth map calculations may equally well be performed in a single module or unit, as in the above-described two modules 140 and 150.

According to another preferred embodiment of the invention, the apparatus 100 includes a calibrating means 160, which is adapted to calibrate the depth map $D_{12}$ into a metric model $D_{12\text{-}m}$ of the physical scene. Thereby, the model may be used to perform adequate measurements of the physical scene.

Figure 2:
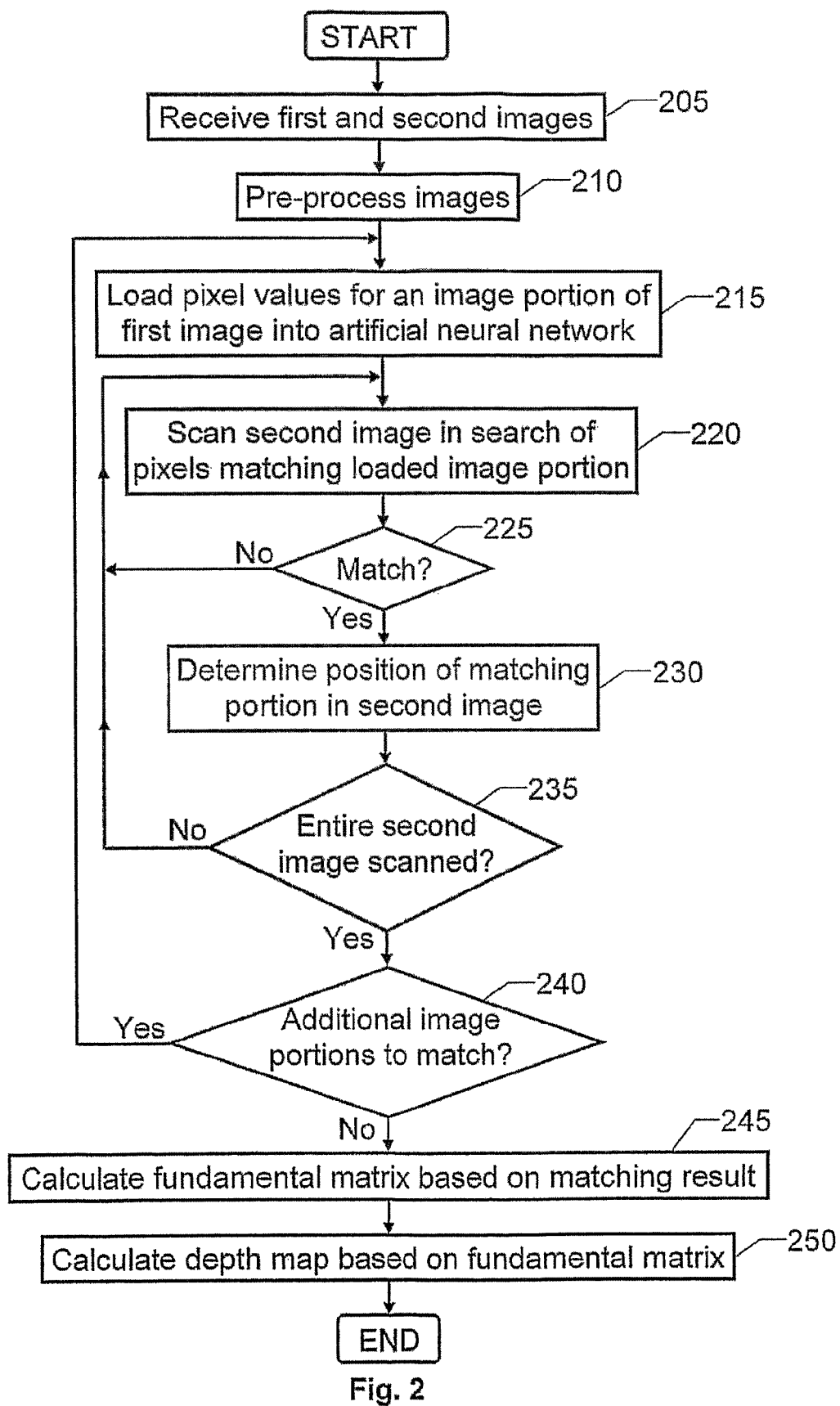
FIG. 2 illustrates, by means of a flow diagram, a general method of automatically modeling a physical scene according to the invention.

In order to sum up, the general method of automatically modeling a physical scene according to the invention will now be described with reference to FIG. 2

A first step 205 receives at least two images of the scene, for example from a still image- or a video camera. For reasons of a clear presentation, however, the following procedure presumes that only two images are received. Nevertheless, according to the invention, the procedure is applicable to any number of images higher than or equal to two. In any case, a first image of these images is presumed to be registered at a first position and a first angle with respect to the scene, and a second image is presumed to be registered at a second position and a second angle with respect to the scene, where at least one of the second position and the second angle is different from the first position and the first angle.

Then, a step 210 pre-processes the received images by adjusting the intensity levels of the images, such that a subsequent image processing is made independent from any initial difference in an absolute intensity level between the received images. Subsequently, a step 215 loads pixel values for an image portion of the first image into an artificial neural network.

Thereafter, by means of the artificial neural network, a step 220 scans the second image in search of pixels representing a second image portion corresponding to the first image portion. A following step 225 investigates whether a match is found, and if so a step 230 follows. Otherwise, the procedure loops back to the step 220.

The step 230 determines a position of the second image portion where the artificial neural network found that the match criterion was fulfilled. Then, a step 235 checks whether the entire second image has yet been scanned, and if not the procedure loops back to the step 220, so that the search may continue after any better matches. If the step 235 finds that the entire second image has been scanned a step 240 checks whether there exist any additional image portions of the first image to match against the second image, and if so the procedure loops back to the step 215. Otherwise, a matching result is produced based on the (possibly iterated) matches determined in the step 230, and a step 245 follows. Here, a fundamental matrix is calculated, which defines a relationship between the first image and the second image.

Subsequently, a step 250 calculates, based on the fundamental matrix, a depth map that describes distance differences between a set of image points in the first image and a corresponding set of image points in the second image. Finally, this depth map serves as a basis for generating the model of the physical scene registered by the at least two images.

All of the process steps, as well as any sub-sequence of steps, described with reference to the FIG. 2 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of automatically modeling a physical scene including a number of objects, the method comprising:

receiving at least two images of the scene of which images a first image is registered at a first position and a first angle with respect to the scene and a second image is registered at a second position and a second angle with respect to the scene, where at least one of the second position and the second angle is different from the first position and the first angle, matching at least one image object in the first image against at least one image object in the second image to obtain a matching result, calculating, based on the matching result, a fundamental matrix defining a relationship between the first image and the second image, and calculating, based on the fundamental matrix, a depth map describing distance differences between a set of image points in the first image and a corresponding set of image points in the second image, wherein the matching comprises loading pixel values for a first image portion of the first image into an artificial neural network, scanning, utilizing the artificial neural network with support from representations in the database, the second image in search of pixels representing a second image portion corresponding to the first image portion, the scanning comprising generating a database that represents image patterns that occur in the first image, and determining a position of the second image portion upon fulfillment of a match criterion in the artificial neural network in respect of the first and second image portions.

2. The method according to claim 1, wherein the matching comprises:
dividing the first image into a number of first regions of interest, and for each first region of interest,
loading pixel values for the first region of interest into the artificial neural network,
scanning, utilizing the artificial neural network, the second image in search of a second region corresponding to the first region of interest, and
determining a position of the second region in the second image upon fulfillment of a match criterion in the artificial neural network in respect of the first regions of interest and the second regions.

3. The method according to claim 2, wherein the matching comprises:
an initial filtering wherein the first and second images are processed into corresponding first and at least one second filtered images with respect to which steps subsequent to the matching are performed.

4. The method according to claim 3, wherein the initial filtering comprises applying an edge detecting operator.

5. The method according to claim 1, further comprising:
calibrating the depth map into a metric model of the physical scene.

6. The method according to claim 1, further comprising:
pre-processing the received images by adjusting the intensity levels of the images such that a subsequent image processing is made independent from any initial difference in an absolute intensity level between the received images.

7. A computer program product, comprising:
a non-transitory computer readable medium; and
computer program instructions recorded on the computer readable medium and directly loadable into the internal memory of a computer, for carrying out a method comprising
receiving at least two images of the scene of which images a first image is registered at a first position and a first angle with respect to the scene and a second image is registered at a second position and a second angle with respect to the scene, where at least one of the second position and the second angle is different from the first position and the first angle,
matching at least one image object in the first image against at least one image object in the second image to obtain a matching result,
calculating, based on the matching result, a fundamental matrix defining a relationship between the first image and the second image, and
calculating, based on the fundamental matrix, a depth map describing distance differences between a set of image points in the first image and a corresponding set of image points in the second image, wherein the matching comprises
loading pixel values for a first image portion of the first image into an artificial neural network,
scanning, utilizing the artificial neural network with support from representations in the database, the second image in search of pixels representing a second image portion corresponding to the first image portion, the scanning comprising generating a database that represents image patterns that occur in the first image, and
determining a position of the second image portion upon fulfillment of a match criterion in the artificial neural network in respect of the first and second image portions when said computer program instructions are run on the computer.

8. An apparatus for automatically modeling a physical scene including a number of objects, the apparatus comprising:
an image interface adapted to receive at least two images of the scene of which images a first image is registered at a first position and a first angle with respect to the scene and a second image is registered at a second position and a second angle with respect to the scene where at least one of the second position and the second angle is different from the first position and the first angle,
a matching module adapted to match image objects in the first image against image objects in the second image, and in response thereto produce a matching result,
a first calculation module adapted to receive the matching result, and based thereon calculate a fundamental matrix defining a relationship between the first image and the second image,
a second calculation module adapted to receive the fundamental matrix, and based thereon calculate a depth map describing distance differences between a set of image points in the first image and a corresponding set of image points in the second image, wherein
the matching module comprises an artificial neural network which is adapted to match the image objects in the first image against the image objects in the second image by
receiving pixel values for at least one first portion of the first image,
scanning the second image in search of pixels representing a respective second portion corresponding to each of the at least one first portion, and
determining a position of the respective second portion upon fulfillment of a match criterion in respect of the first and second portions, and
a database into which the artificial neural network is adapted to store representations of image patterns that occur in the first image, and the artificial neural network is further adapted to perform the scanning of the second image with support from representations in the database.

9. The apparatus according to claim 8, wherein the matching module comprises a divider adapted to divide the first image into a number of first regions of interest, for each first region of interest the matching module is adapted to
load pixel values for the first region of interest into the artificial neural network,
scan the second image in search of a second corresponding to the first region of interest, and
determine a position of the second region upon fulfillment of a match criterion in respect of the first regions of interest and the second region.

10. The apparatus according to claim 9, further comprising:
an image pre-processor adapted to adjust intensity levels of the received images such that a subsequent image processing is made independent from any initial difference in an absolute intensity level between the received images.

11. The apparatus according to claim 10, wherein the image pre-processor comprises a filter adapted to perform an initial filtering wherein the first and second images are processed into corresponding first and second filtered images with respect to which the divider is adapted to perform subsequent steps.

12. The apparatus according to claim 11, wherein the filter comprises an edge detecting operator.

13. The apparatus according to claim 8, further comprising:
a calibrator adapted to calibrate the depth map into a metric model of the physical scene.

14. The apparatus according to claim 8, wherein the image interface is adapted to be connected to a camera, and wherein said camera is adapted to register the at least two images, and deliver the images to the apparatus via the image interface.

* * * * *